US012756949B2

(12) United States Patent
Kimura

(10) Patent No.: US 12,756,949 B2
(45) Date of Patent: Oct. 6, 2026

(54) PHOTOELECTRIC CONVERSION DEVICE, MOVABLE APPARATUS, CONTROL METHOD, AND STORAGE MEDIUM

(71) Applicant: CANON KABUSHIKI KAISHA, Tokyo (JP)

(72) Inventor: Takayuki Kimura, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/788,273

(22) Filed: Jul. 30, 2024

(65) Prior Publication Data

US 2025/0088763 A1 Mar. 13, 2025

(30) Foreign Application Priority Data

Sep. 12, 2023 (JP) ................................ 2023-147319

(51) Int. Cl.
*H04N 25/583* (2023.01)
*H04N 25/62* (2023.01)
(Continued)

(52) U.S. Cl.
CPC ........... *H04N 25/583* (2023.01); *H04N 25/62* (2023.01); *H04N 25/77* (2023.01); *H04N 25/771* (2023.01); *H04N 25/773* (2023.01)

(58) Field of Classification Search
CPC ...... H04N 25/17; H04N 25/583; H04N 25/62; H04N 25/57; H04N 25/59; H04N 25/768; H04N 25/77; H04N 25/771; H04N 25/773
See application file for complete search history.

(56) References Cited

U.S. PATENT DOCUMENTS

2020/0351464 A1* 11/2020 Ikedo ..................... H04N 25/51
2022/0201182 A1* 6/2022 Maekawa ............ H04N 25/583
(Continued)

FOREIGN PATENT DOCUMENTS

JP H08214211 A 8/1996

OTHER PUBLICATIONS

Extended European Search Report issued by the European Patent Office on Nov. 11, 2024 in corresponding EP Patent Application No. 24192280.6.
(Continued)

*Primary Examiner* — Lin Ye
*Assistant Examiner* — Chriss S Yoder, III
(74) *Attorney, Agent, or Firm* — Carter, DeLuca & Farrell LLP

(57) ABSTRACT

A photoelectric conversion device includes a photoelectric conversion unit emitting pulses corresponding to photons, a counter counting the number of pulses, and a plurality of pixels each including a memory storing a count value of the counter, wherein an image signal is generated on the basis of a difference between count values of the counter at the start and end of an accumulation period, wherein first to (N−1)th (N≥2) image signals generated during first to (N−1)th accumulation periods during a period from the end of the first accumulation period to the end of the Nth accumulation period is outputted, wherein the first to Nth accumulation periods are within one full frame period and each of the first to (N−1)th accumulation periods is shorter than the Nth accumulation period, and a synthetic image signal is generated by synthesizing two or more image signals having different accumulation periods among the first to Nth image signals.

5 Claims, 13 Drawing Sheets

(51) Int. Cl.

| | |
|---|---|
| ***H04N 25/77*** | (2023.01) |
| ***H04N 25/771*** | (2023.01) |
| ***H04N 25/773*** | (2023.01) |

(56) References Cited

U.S. PATENT DOCUMENTS

| | | | |
|---|---|---|---|
| 2023/0224609 | A1 | 7/2023 | Hikosaka |
| 2024/0402311 | A1 | 12/2024 | Kimura |
| 2024/0406574 | A1 | 12/2024 | Saito et al. |
| 2024/0406598 | A1 | 12/2024 | Saito et al. |
| 2025/0008238 | A1 | 1/2025 | Kimura |
| 2025/0088761 | A1 | 3/2025 | Kimura |
| 2025/0088772 | A1 | 3/2025 | Fujimori |

OTHER PUBLICATIONS

Extended European Search Report issued by the European Patent Office on Aug. 10, 2026 in corresponding EP Patent Application No. 24192280.6.

* cited by examiner

PHOTOELECTRIC CONVERSION DEVICE, MOVABLE APPARATUS, CONTROL METHOD, AND STORAGE MEDIUM

BACKGROUND OF THE INVENTION

Field of the Invention

The present invention relates to a photoelectric conversion device, a movable apparatus, a control method, a storage medium, and the like.

Description of the Related Art

Since the past, a technique of expanding a dynamic range by synthesizing a plurality of images captured at different accumulation periods has been well known. For example, Japanese Patent Laid-Open No. H8-214211 discloses a technique of expanding a dynamic range by capturing an image with appropriate exposure, performing second image capture if it is determined that the dynamic range needs to be expanded, and synthesizing the images.

However, if the technique disclosed in Japanese Patent Laid-Open No. H8-214211 is used, the timings of first and second image capture are different from each other, and thus if a subject moves, a synthetic image with the position of the subject shifted is generated. As the movement of the subject becomes faster, the amount of shift in the position of the subject increases, resulting in a synthetic image that gives a sense of discomfort.

In addition, in order to expand the dynamic range, it is necessary to change the length of the accumulation period between the first and second image capture, and thus the amount of blur of the subject differs between the two images. That is, when image synthesis is performed, there is a possibility of an image giving a sense of discomfort being generated near the contour of the subject. Specifically, a resulting synthetic image has a clear contour in the bright area of the subject and a blurred contour in the dark area thereof.

Further, in order to expand the dynamic range, images accumulated in a short second (short period) are needed to preserve the gradation of a bright subject, and thus if LED light enters the subject, a flicker phenomenon occurs. For example, in in-vehicle applications, traffic signals and signs using LEDs may become unrecognizable, and subjects illuminated by headlights may become dark.

SUMMARY OF THE INVENTION

According to an aspect of the present invention, there is provided a photoelectric conversion device including:

- a photoelectric conversion unit emitting pulses corresponding to photons;
- a counter counting the number of the pulses;
- a plurality of pixels each including a memory storing a count value of the counter;
- one or more memories storing instructions; and
- one or more processors executing the instructions to
- generate an image signal on the basis of a difference between count values of the counter at the start and end of an accumulation period,
- output first to (N−1)th (N≥2) image signals generated during first to (N−1)th accumulation periods during a period from the end of the first accumulation period to the end of the Nth accumulation period, wherein the first to Nth accumulation periods are within one full frame period and each of the first to (N−1)th accumulation periods is shorter than the Nth accumulation period; and
- generate a synthetic image signal by synthesizing two or more image signals having different accumulation periods among the first to Nth image signals.

Further features of the present invention will become apparent from the following description of embodiments with reference to the attached drawings.

DESCRIPTION OF THE EMBODIMENTS

Hereinafter, with reference to the accompanying drawings, favorable modes of the present invention will be described using Embodiments. In each diagram, the same reference signs are applied to the same members or elements, and duplicate description will be omitted or simplified.

Figure 1:
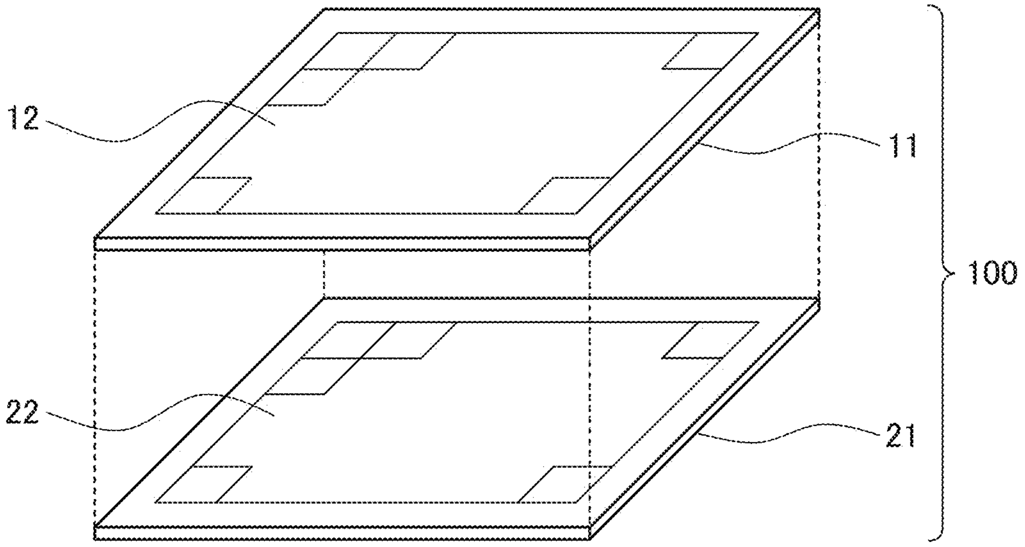
FIG. 1 is a diagram illustrating a configuration example of a photoelectric conversion element according to an embodiment of the present invention.

FIG. 1 is a diagram illustrating a configuration example of a photoelectric conversion element according to an embodiment of the present invention. Hereinafter, a photoelectric conversion device having a so-called laminated structure in which a photoelectric conversion element 100 is configured by laminating and electrically connecting two substrates, a sensor substrate 11 and a circuit substrate 21, will be described as an example.

However, a so-called non-laminated structure in which components included in the sensor substrate and components included in the circuit substrate are disposed on a common semiconductor layer may be used. The sensor substrate 11 includes a pixel region 12. The circuit substrate 21 includes a circuit region 22 that processes signals detected in the pixel region 12.

Figure 2:
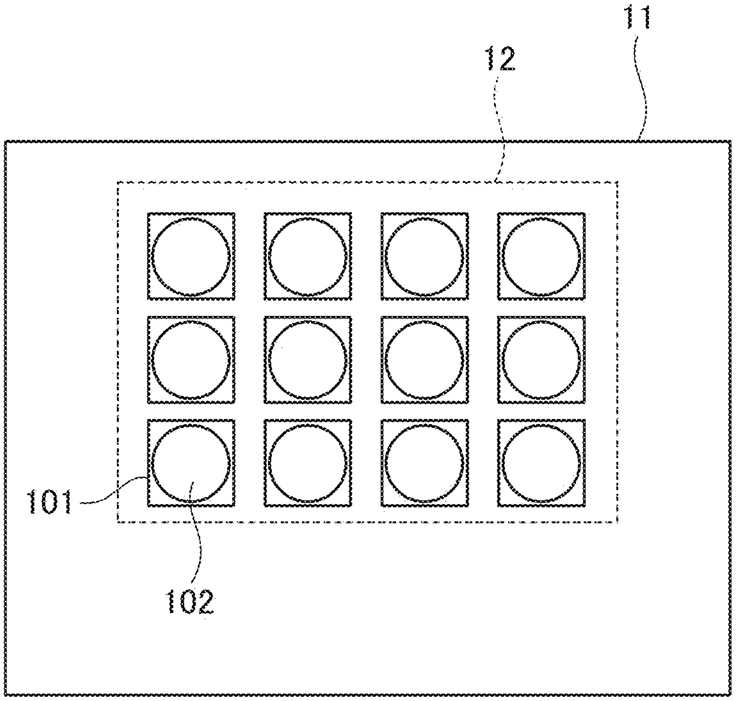
FIG. 2 is a diagram illustrating a configuration example of a sensor substrate 11.

FIG. 2 is a diagram illustrating a configuration example of the sensor substrate 11. The pixel region 12 of the sensor substrate 11 includes a plurality of pixels 101 arranged two-dimensionally across a plurality of rows and columns. The pixels 101 include a photoelectric conversion unit 102 including an avalanche photodiode (hereinafter, an APD), and the photoelectric conversion unit 102 emits pulses at a frequency corresponding to the frequency of photon reception. Meanwhile, the number of rows and columns of the pixel array constituting the pixel region 12 is not particularly limited.

Figure 3:
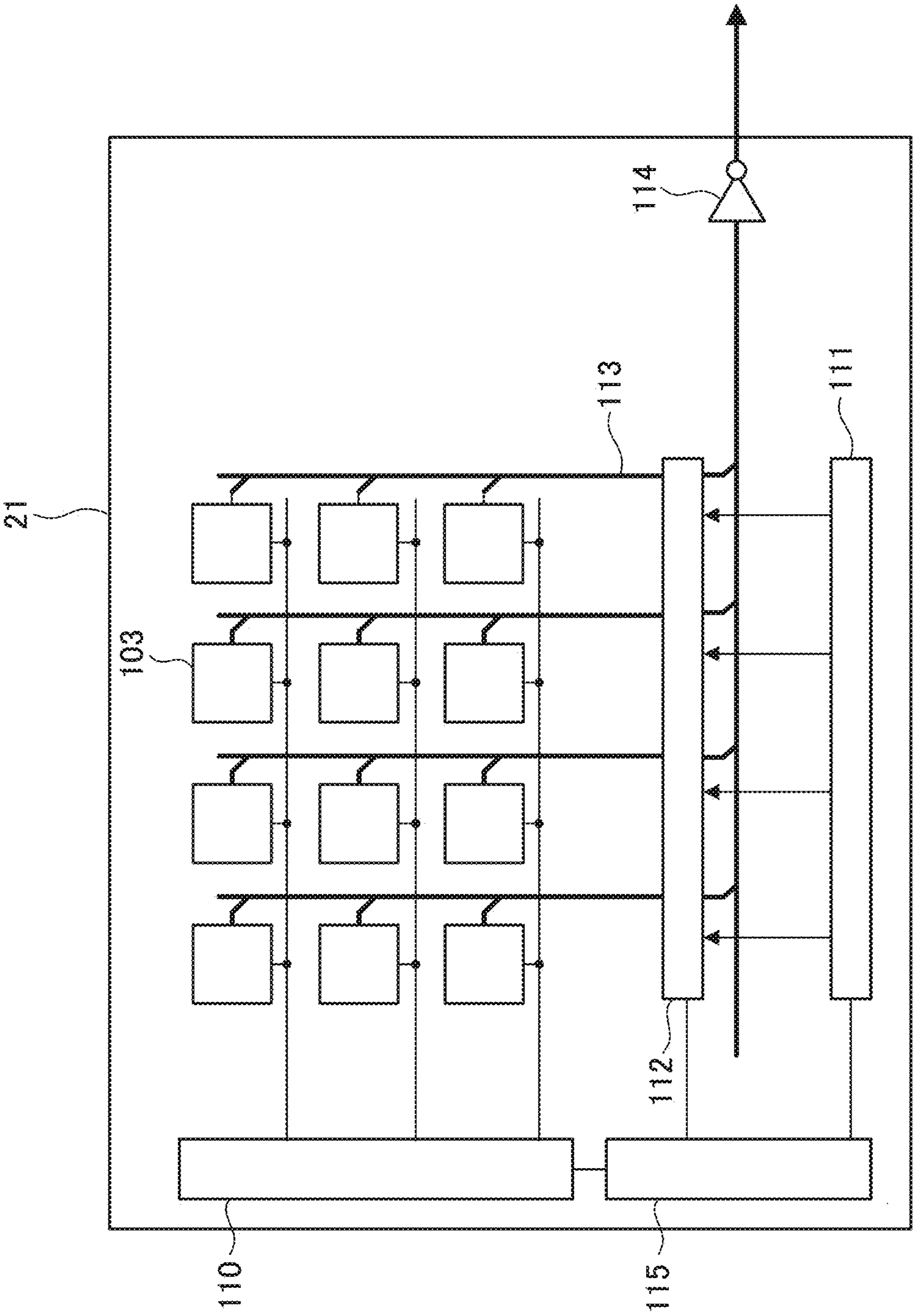
FIG. 3 is a diagram illustrating a configuration example of a circuit substrate 21.

FIG. 3 is a diagram illustrating a configuration example of the circuit substrate 21. The circuit substrate 21 includes signal processing circuits 103 that process electric charges photoelectrically converted by each photoelectric conversion unit 102 in FIG. 2, a readout circuit 112, a control pulse generation unit 115, a horizontal scanning circuit 111, vertical signal lines 113, a vertical scanning circuit 110, and an output circuit 114.

The vertical scanning circuit 110 receives a control pulse supplied from the control pulse generation unit 115 and sequentially supplies the control pulse to a plurality of pixels arranged in the row direction. Logic circuits such as a shift register and an address decoder are used in the vertical scanning circuit 110.

A signal output from the photoelectric conversion unit 102 of each pixel is processed by each signal processing circuit 103. The signal processing circuit 103 is provided with a counter, a memory, and the like, and a digital value is held in the memory. The horizontal scanning circuit 111 inputs a control pulse for sequentially selecting each column to the signal processing circuit 103 in order to read the signal from the memory of each pixel in which a digital signal is held.

A signal is output to the vertical signal line 113 from the signal processing circuit 103 of the pixel in the row selected by the vertical scanning circuit 110. The signal output to the vertical signal line 113 is output to the outside of the photoelectric conversion element 100 through the readout circuit 112 and the output circuit 114. The readout circuit 112 has a plurality of buffers built therein and connected to the vertical signal line 113.

As shown in FIGS. 2 and 3, a plurality of signal processing circuits 103 are disposed in a region overlapping the pixel region 12 in a plan view. The vertical scanning circuit 110, the horizontal scanning circuit 111, the readout circuit 112, the output circuit 114, and the control pulse generation unit 115 are disposed so as to overlap between an end of the sensor substrate 11 and an end of the pixel region 12 in a plan view.

That is, the sensor substrate 11 has the pixel region 12 and a non-pixel region disposed around the pixel region 12. The vertical scanning circuit 110, the horizontal scanning circuit 111, the readout circuit 112, the output circuit 114, and the control pulse generation unit 115 are disposed in a region overlapping the non-pixel region in a plan view.

Meanwhile, the arrangement of the vertical signal lines 113 and the arrangement of the readout circuit 112 and the output circuit 114 are not limited to the example shown in FIG. 3. For example, the vertical signal line 113 may be disposed to extend in the row direction, and the readout circuit 112 may be disposed at the ends where the vertical signal lines 113 extend. In addition, one signal processing circuit 103 does not necessarily need to be provided for each photoelectric conversion unit, and a configuration in which one signal processing unit is shared by a plurality of photoelectric conversion units and performs signal processing sequentially may be used.

Figure 4:
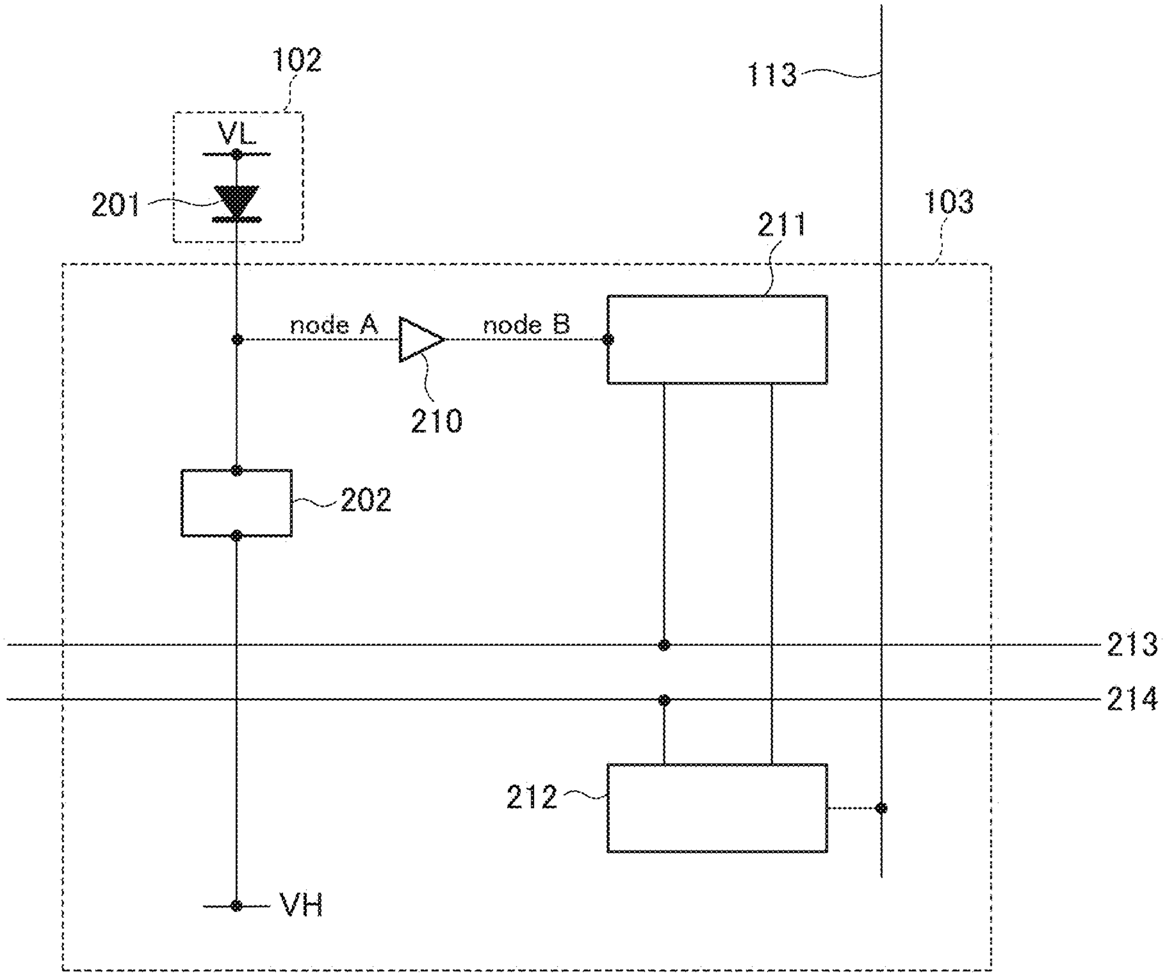
FIG. 4 is a diagram illustrating an equivalent circuit of a pixel 101 and a signal processing circuit 103 corresponding to the pixel 101 in FIGS. 2 and 3.

FIG. 4 is a diagram illustrating an equivalent circuit of the pixel 101 in FIGS. 2 and 3 and the signal processing circuit 103 corresponding to the pixel 101.

An APD 201 included in the photoelectric conversion unit 102 generates a pair of electric charges corresponding to incident light through photoelectric conversion. One of two nodes of the APD 201 is connected to a power supply line to which a drive voltage VL (first voltage) is supplied. In addition, the other of the two nodes of the APD 201 is connected to a power supply line to which a drive voltage VH (second voltage) higher than the voltage VL is supplied.

In FIG. 4, one node of the APD 201 is an anode, and the other node of the APD is a cathode. A reverse bias voltage is supplied to the anode and cathode of the APD 201 so that the APD 201 performs an avalanche multiplication operation. By supplying such a voltage, the electric charges generated by the incident light cause avalanche multiplication, and an avalanche current is generated.

Meanwhile, if the voltage of a reverse bias is supplied, there are two modes: a Geiger mode in which an operation is performed with a voltage difference between the anode and cathode greater than the breakdown voltage, and a linear mode in which an operation is performed with a voltage difference between the anode and cathode close to or less than the breakdown voltage. An APD operated in the Geiger mode is referred to as an SPAD. In the case of an SPAD, for example, the drive voltage VL (first voltage) is −30 V, and the drive voltage VH (second voltage) is 1 V.

The signal processing circuit 103 includes a quench element 202, a waveform shaping unit 210, a counter circuit 211, and a memory circuit 212. The quench element 202 is connected to a power supply line to which the drive voltage VH is supplied and one of the anode and cathode nodes of the APD 201.

The quench element 202 functions as a load circuit (quench circuit) during signal multiplication using avalanche multiplication, and has a function of suppressing a voltage supplied to the APD 201 and suppressing the avalanche multiplication (quench operation). In addition, the quench element 202 has a function of returning the voltage supplied to the APD 201 to the drive voltage VH by passing a current corresponding to the amount of the voltage drop caused by the quench operation (recharge operation).

FIG. 4 shows an example in which the signal processing circuit 103 includes the waveform shaping unit 210, the counter circuit 211, and the memory circuit 212 in addition to the quench element 202.

The waveform shaping unit 210 shapes a change in the voltage of the cathode of the APD 201 obtained during photon detection, and outputs a pulse signal. As the waveform shaping unit 210, for example, an inverter circuit is used. FIG. 4 shows an example in which one inverter is used as the waveform shaping unit 210, but a circuit having a plurality of inverters connected in series may be used, or any other circuit having a waveform shaping effect may be used.

The counter circuit 211 counts the number of pulses output from the waveform shaping unit 210 and holds the count value. In addition, when a control pulse RES is supplied through a drive line 213, a signal held in the counter circuit 211 is reset. Here, the counter circuit 211 generates a signal on the basis of the difference between the count values at the start and end of the accumulation period.

A control pulse SEL is supplied to the memory circuit 212 from the vertical scanning circuit 110 in FIG. 3 through a drive line 214 in FIG. 4 (not shown in FIG. 3) to switch electrical connection and non-connection between the counter circuit 211 and the vertical signal line 113. The memory circuit 212 functions as a memory that temporarily stores the count value of the counter, and outputs an output signal from the counter circuit 211 of the pixel to the vertical signal line 113.

Meanwhile, a switch such as a transistor may be disposed between the quench element 202 and the APD 201 or between the photoelectric conversion unit 102 and the signal processing circuit 103 to switch the electrical connection. Similarly, the supply of the drive voltage VH or the drive voltage VL supplied to the photoelectric conversion unit 102 may be electrically switched using a switch such as a transistor.

Figure 5:
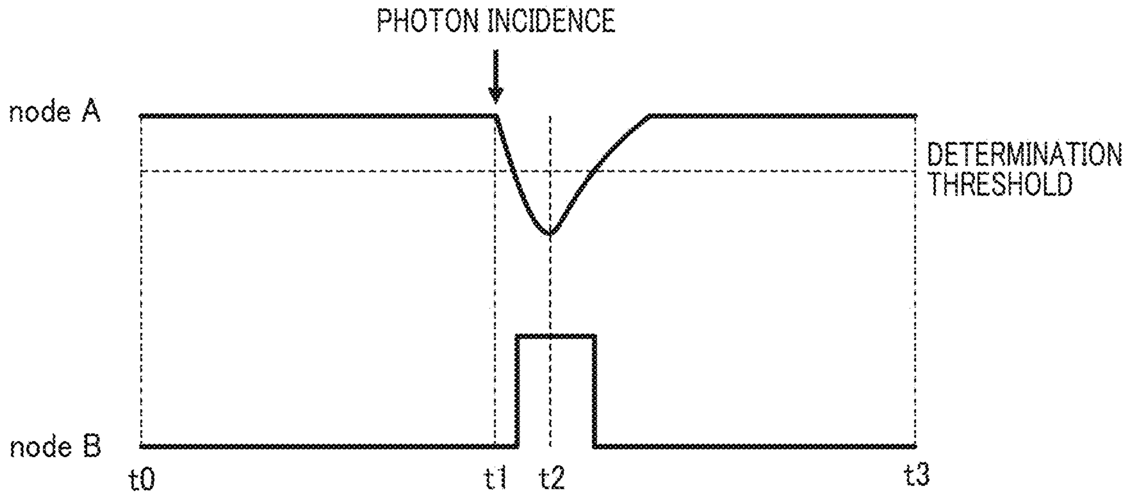
FIG. 5 is a diagram schematically illustrating a relationship between an operation of an APD 201 and an output signal.

FIG. 5 is a diagram schematically illustrating a relationship between the operation of the APD 201 and the output signal. The input side of the waveform shaping unit 210 is defined as a node A, and the output side thereof is defined as a node B. Between time t0 and time t1, a potential difference of VH-VL is applied to the APD 201. If a photon is incident on the APD 201 at time t1, avalanche multiplication occurs in the APD 201, an avalanche multiplication current flows through the quench element 202, and the voltage of the node A drops.

If the amount of voltage drop becomes even larger and the potential difference applied to the APD 201 becomes smaller, the avalanche multiplication of the APD 201 stops as shown at time t2, and the voltage level of the node A does not drop below a certain value.

Thereafter, between time t2 and time t3, a current flows through the node A to compensate for the amount of the voltage drop from the voltage VL, and the node A settles at the original potential level at time t3. In this case, the portion of the output waveform at the node A that exceeds a certain threshold is shaped by the waveform shaping unit 210 and is output as a pulse signal at the node B.

Figure 6:
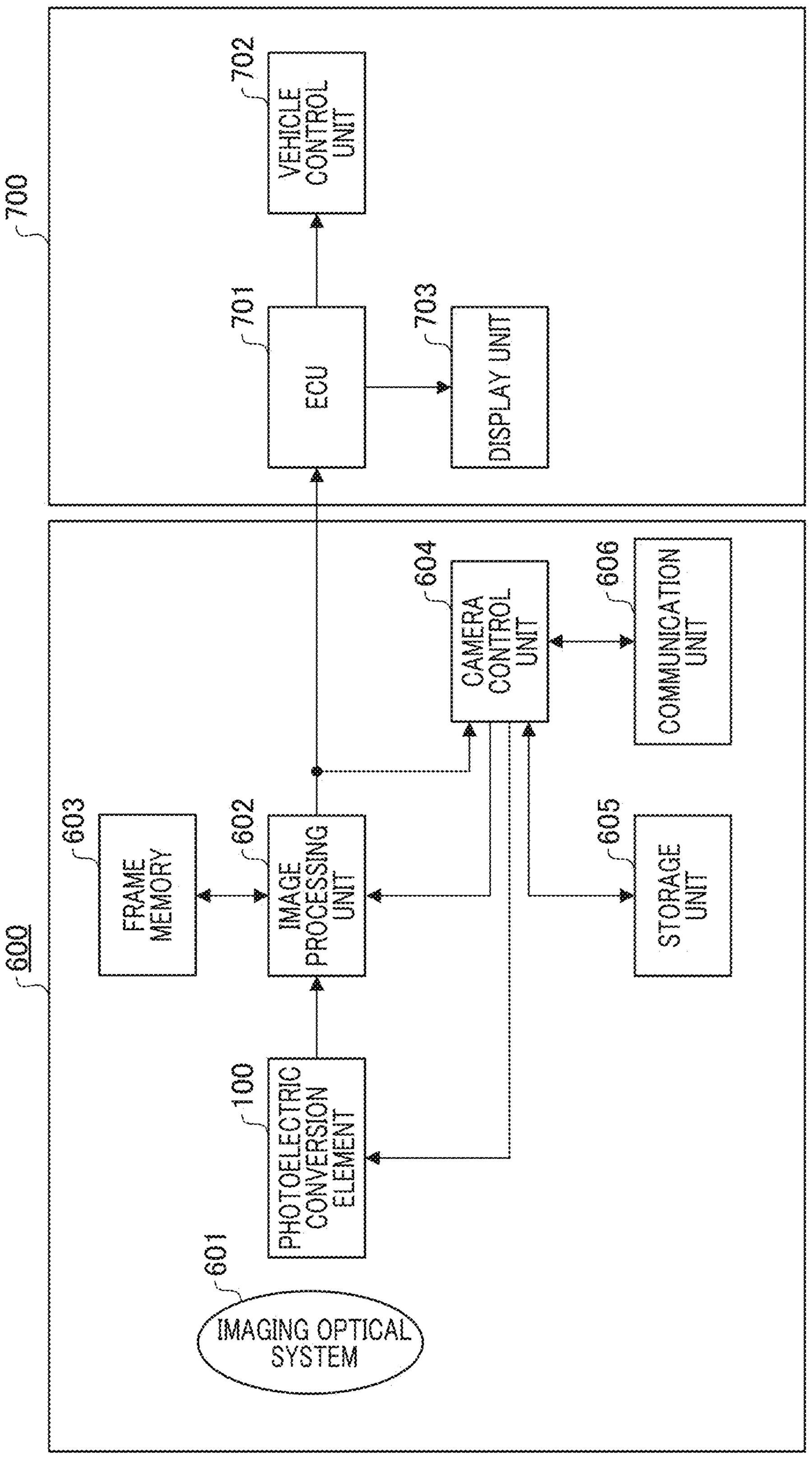
FIG. 6 is a functional block diagram illustrating functions of a photoelectric conversion device 600 and a movable apparatus 700 according to the embodiment.

Next, a photoelectric conversion device 600 and a movable apparatus 700 according to an embodiment will be described. FIG. 6 is a functional block diagram of the photoelectric conversion device 600 and the movable apparatus 700 according to the embodiment. Meanwhile, some of the functional blocks shown in FIG. 6 are realized by causing a computer (not shown) included in the photoelectric conversion device 600 and the movable apparatus 700 to execute a computer program stored in a memory serving as a storage medium (not shown).

However, some or all of them may be realized by hardware. Examples of hardware that can be used include a dedicated circuit (ASIC), a processor (a reconfigurable processor, a DSP), and the like.

In addition, the functional blocks shown in FIG. 6 do not have to be built into the same housing, and may be configured as separate devices connected to each other through signal paths. Meanwhile, the above description of FIG. 6 also applies to the functional blocks of FIGS. 7A, 7B, and 8A which will be described later.

The photoelectric conversion device 600 has the photoelectric conversion element 100 including the avalanche photodiode described in FIGS. 1 to 5 for performing photoelectric conversion on an optical image. In addition, the photoelectric conversion device 600 includes an imaging optical system 601, an image processing unit 602, a frame memory 603, a camera control unit 604, a storage unit 605, a communication unit 606, and the like.

The photoelectric conversion device of the embodiment is mounted on the movable apparatus 700, and a camera unit composed of a set of the imaging optical system 601 and the photoelectric conversion element 100 is configured to capture images in at least one direction, for example, in front, behind, and to the side of the movable apparatus. Meanwhile, a plurality of camera units may be provided in the movable apparatus 700.

Meanwhile, in the present embodiment, the movable apparatus 700 will be described, for example, using an example of an automobile, but the movable apparatus may be any other type such as an airplane, a train, a ship, a drone, an AGV, or a robot insofar as it can move.

Figure 7A:
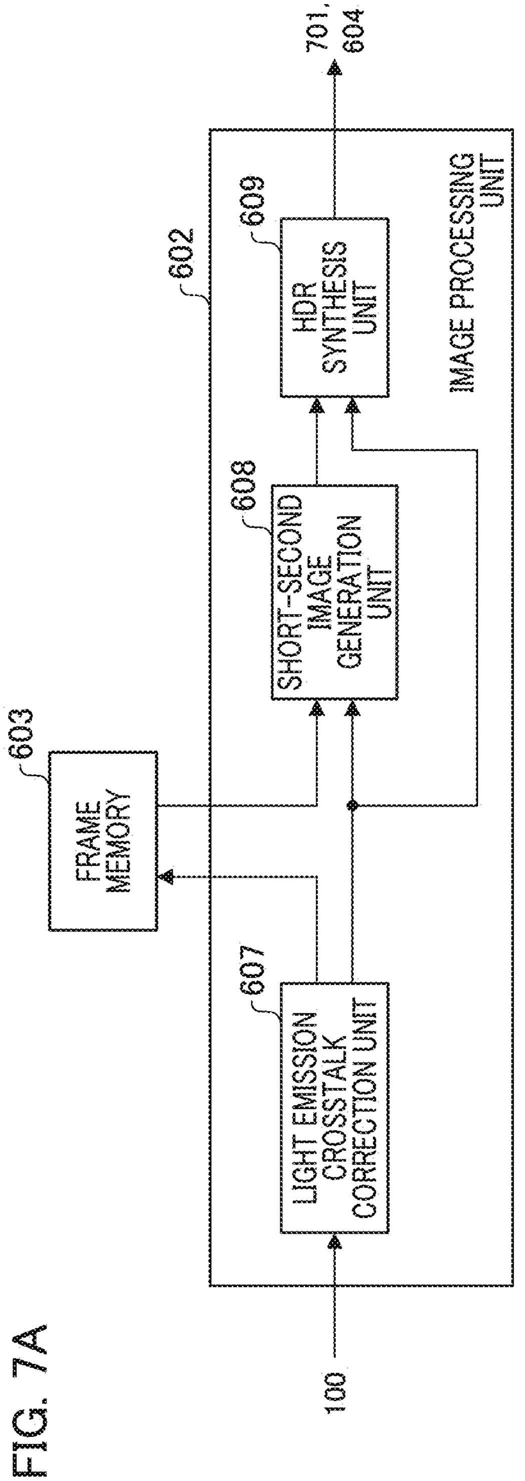
FIG. 7A is a functional block diagram illustrating a configuration example of an image processing unit 602.

The function of the image processing unit 602 will be described in detail. FIG. 7A is a functional block diagram illustrating a configuration example of the image processing unit 602. As shown in FIG. 7A, the image processing unit 602 includes at least a light emission crosstalk correction unit 607, a short-second (short period) image generation unit 608, and an HDR (high dynamic range) synthesis unit 609.

The light emission crosstalk correction unit 607 is used to correct light emission crosstalk in which a signal is detected in an adjacent pixel due to light emission in a high electric field region. As a method of correcting light emission crosstalk, a known correction method based on theoretical values may be used, or other methods based on actual measurement results and the like may be used.

After the light emission crosstalk is corrected by the light emission crosstalk correction unit 607, the image signal is output to the frame memory 603, the short-second image generation unit 608, and the HDR synthesis unit 609. The functional block to which the image signal is output will be described later.

The frame memory 603 is used to temporarily store image signals when various types of image processing are performed using the image processing unit 602. For example, when a new image is generated using a plurality of images, it is used to temporarily store a plurality of image signals which are original images. In the present embodiment, the frame memory 603 is used when a short-second image signal to be described later is generated, or when HDR synthesis is performed.

The short-second image generation unit 608 is used to generate a short-second image signal required when an HDR image is generated, and generates the short-second image signal on the basis of the image signal output from the light emission crosstalk correction unit 607 and the image signal read out from the frame memory 603. The details of a method of generating a short-second image signal will be described later with reference to FIG. 7B. The short-second image signal generated by the short-second image generation unit 608 is output to the HDR synthesis unit 609.

The HDR synthesis unit 609 generates a final HDR image using the short-second image signal generated by the short-second image generation unit 608 and the long-second (long period) image signal output from the light emission crosstalk correction unit 607. The details of a method of generating an HDR image will be described later with reference to FIG. 8A.

Meanwhile, in the present embodiment, the image processing unit 602 is composed of three blocks of the light emission crosstalk correction unit 607, the short-second image generation unit 608, and the HDR synthesis unit 609. However, for example, image processing such as black level correction, gamma curve correction, noise reduction, digital gain adjustment, demosaic processing, and data compression may be performed on the image signal output from the photoelectric conversion element 100.

In addition, if the photoelectric conversion element 100 has an on-chip color filter such as RGB, it is desirable to perform processing such as white balance correction and color conversion in the image processing unit 602. The HDR image generated by the HDR synthesis unit 609 in the image processing unit 602 is output to the camera control unit 604 and an electric control unit (ECU) 701 within the movable apparatus 700.

The camera control unit 604 incorporates a CPU serving as a computer and a memory having a computer program stored therein, and controls each unit of the photoelectric conversion device 600 by the CPU executing the computer program stored in the memory.

Meanwhile, the camera control unit 604 controls and the like the length of the exposure period of each frame of the photoelectric conversion element 100 and the timing of a control signal CLK, for example, through the control pulse generation unit of the photoelectric conversion element 100.

In addition, the camera control unit 604 also performs various processes for generating an HDR image using the image processing unit 602 and the frame memory 603, controls writing of an image signal output from the HDR synthesis unit 609 to the storage unit 605, and the like. Further, it also communicates with the ECU 701 within the movable apparatus 700.

The storage unit 605 includes a recording medium such as, for example, a memory card or a hard disk, and can store and read out a final image signal. The communication unit 606 includes a wireless or wired interface, and outputs the generated image signal to the outside of the photoelectric conversion device 600 and receives various signals from the outside. As an interface, for example, wired communication according to standards such as SPI or I2C may be used, or a wireless LAN system such as Wi-Fi, Bluetooth (registered trademark), or the like may be used.

The ECU 701 incorporates a CPU serving as a computer and a memory having a computer program stored therein, and controls each unit of the movable apparatus 700 by the CPU executing the computer program stored in the memory.

The output of the ECU 701 is supplied to a vehicle control unit 702 and a display unit 703. The vehicle control unit 702 functions as a movement control unit that performs movement control such as driving, stopping, and direction control on a vehicle serving as a movable apparatus on the basis of the output of the ECU 701.

In addition, the display unit 703 includes a display element such as, for example, a liquid crystal device or an organic EL, and is mounted on the movable apparatus 700. The display unit 703 displays images acquired by the photoelectric conversion element 100 and various types of information relating to the traveling condition of the vehicle and the like to the driver of the movable apparatus 700 using, for example, a GUI on the basis of the output of the ECU 701.

Meanwhile, the image processing unit 602, the frame memory 603, and the like in FIG. 6 do not have to be mounted on the movable apparatus 700. For example, they may be provided in an external terminal or the like which is provided separately from the movable apparatus 700 for remotely controlling the movable apparatus 700 or for monitoring the traveling of the movable apparatus. In addition, a recognition unit may be provided in either the photoelectric conversion device 600 or the movable apparatus 700, and the recognition result may be used to control the vehicle, notify the driver, or the like.

Figure 9:
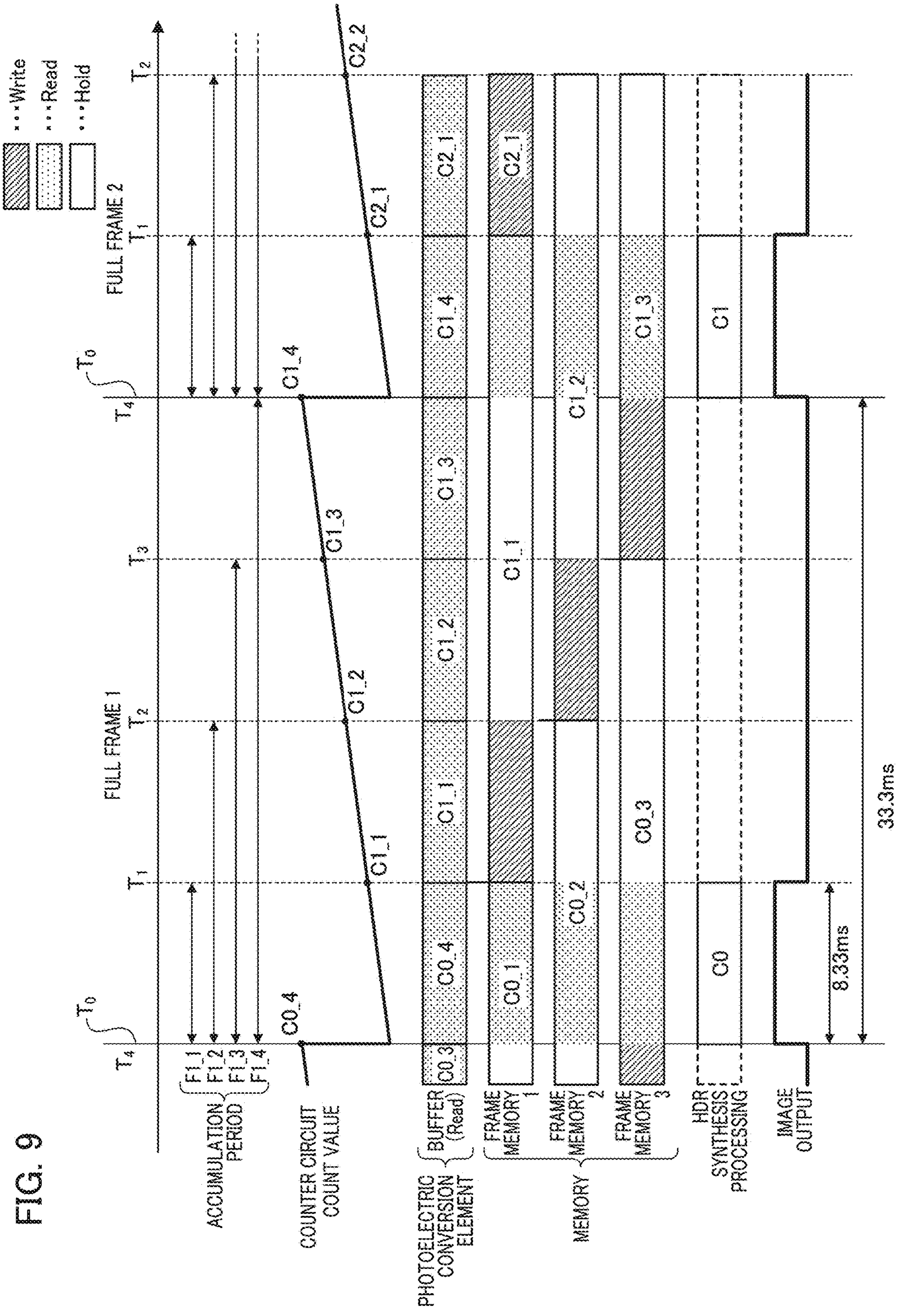
FIG. 9 is a diagram illustrating processing from photoelectric conversion to image output which is performed by a camera control unit 604 according to the embodiment.

FIG. 9 is a diagram illustrating processing from photoelectric conversion to image output which is performed by the camera control unit 604 according to the embodiment.

Meanwhile, in the present embodiment, one frame having a length of 33.3 ms is referred to as a full frame (or a main frame), and a full frame divided into four parts is referred to as a frame (or a sub-frame). In the present embodiment, one full frame having a length of 33.3 ms is divided into four parts.

That is, as shown in FIG. 9, a full frame 1 is divided into a frame 1_1, a frame 1_2, a frame 1_3, and a frame 1_4 of an equal period (8.33 ms). Meanwhile, in FIG. 9 and subsequent figures, frames 1_1, 1_2, 1_3, 1_4, and the like are represented as F1_1, 1_2, 1_3, 1_4, and the like.

Meanwhile, the frame 1_1 has an accumulation period from start time T0 of the full frame 1 to time T1, and the frame 1_2 has an accumulation period from time T0 to time T2. In addition, the frame 1_3 has an accumulation period from time T0 to time T3, and the frame 1_4 has an accumulation period from time T0 to time T4.

Meanwhile, the number of divisions may be N (integer). Therefore, the present embodiment need only have first to Nth ($N \geq 2$) accumulation periods within one full frame. The first to (N−1)th accumulation periods are shorter than the Nth accumulation period, and the first to (N−1)th image signals generated during the first to (N−1)th accumulation periods need only be controlled to be output during a period from the end of the first accumulation period to the end of the Nth accumulation period.

Meanwhile, as shown in FIG. 9, the first to (N−1)th accumulation periods and the Nth accumulation period overlap each other, and the first to (N−1)th accumulation periods and the Nth accumulation period start simultaneously. In addition, the end of the Nth accumulation period coincides with the end of the full frame.

First, the processing flow of the frame 1_1 will be described. At time T0, the camera control unit 604 resets the counter circuit 211 within the photoelectric conversion element 100, performs period accumulation for the period from time T0 to time T1, and then reads out a count value C1_1 for the period from time T1 to time T2. Specifically, after C1_1 is temporarily stored in the memory circuit 212, it is output from photoelectric conversion element to the image processing unit 602 through the buffer of the readout circuit 112.

C1_1 read out from the photoelectric conversion element 100 undergoes the above-described light emission crosstalk correction by the light emission crosstalk correction unit 607 within the image processing unit 602, and the corrected image signal is promptly written into the region of the frame memory 1 within the frame memory 603.

That is, the count value C1_1 of each pixel of the frame 1_1 starts to be written into the frame memory 603 at the timing of time T1, and the writing of C1_1 for all lines is completed at the timing of time T2. The image information of C1_1 is held in the frame memory 603 as it is.

In the present embodiment, for convenience of description, it is assumed that the delay time associated with the processing in the image processing unit 602 is short and negligible. However, if the delay time is not negligible, it is not necessarily necessary to complete writing in the frame memory 603 by time T2.

Subsequently, for the frame 1_2, period accumulation for the period from time T0 to time T2 is similarly performed, and then a count value C1_2 is read out for the period from time T2 to time T3. After various processes are performed, the count value is written into the region of the frame memory 2 within the frame memory 603. The image information of the frame 1_2 is then held in the frame memory 603.

For the frame 1_3, period accumulation for the period from time T0 to time T3 is similarly performed, and then a count value C1_3 is read out for the period from time T3 to time T4. After various processes are performed, the count value is written into the region of the frame memory 3 within the frame memory 603. The image information of the frame 1_3 is then held in the frame memory 603.

For the frame 1_4, period accumulation for the period from time T0 to time T4 of the full frame 1 is performed, and then a count value C1_4 is acquired for the period from time T0 to time T1 of the full frame 2. After various processes are performed, the count value is output to the short-second image generation unit 608.

The reason why C1_4 is not written into the frame memory 603 temporarily is to promptly generate a short-second image signal by the short-second image generation unit 608 and perform HDR synthesis processing, to shorten the time until image output insofar as possible and to reduce the capacity of the frame memory 603.

However, if the speed of processing of generating a short-second image signal to be described later falls below the output speed of the image signal output from the light emission crosstalk correction unit 607, a region called a frame memory 4 is newly provided within the frame memory 603 to hold image information.

Figure 7B:
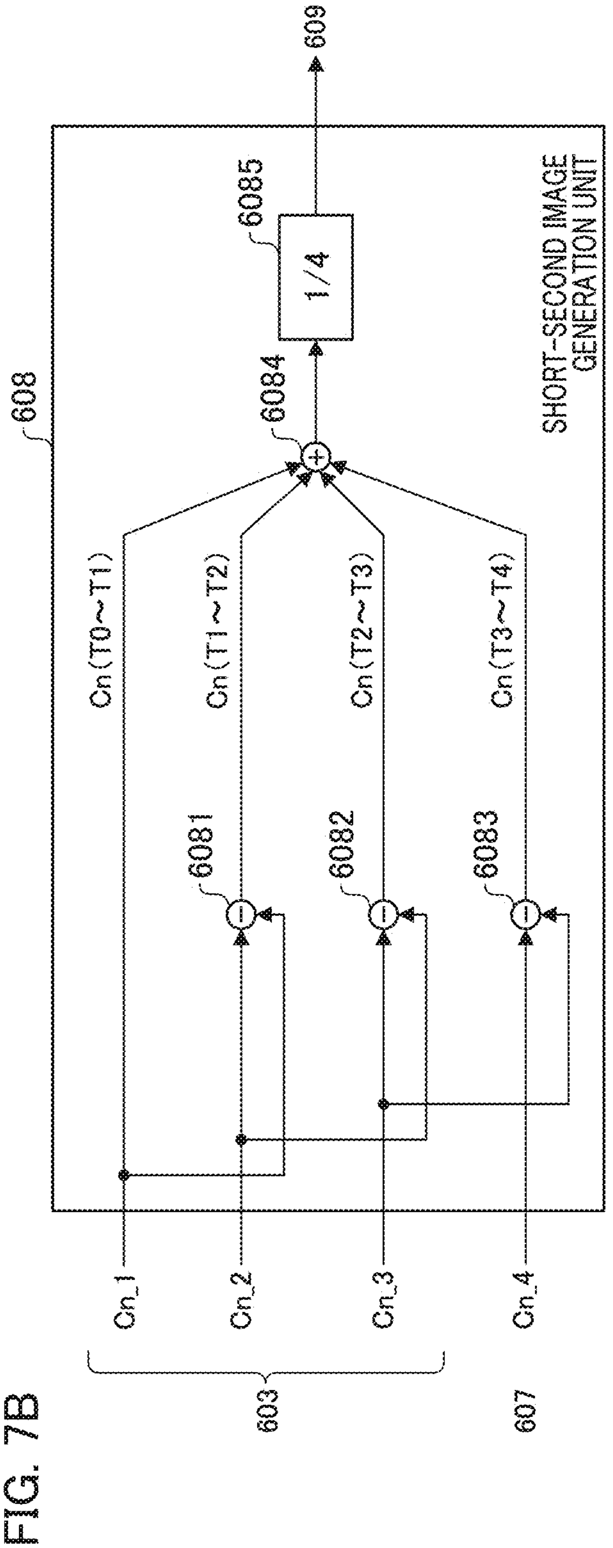
FIG. 7B is a functional block diagram illustrating a configuration example of a short-second image generation unit 608.

A method in which the short-second image generation unit 608 generates a short-second image signal will be described with reference to FIG. 7B. FIG. 7B is a functional block diagram illustrating a configuration example of the short-second image generation unit 608. The generation of a short-second image signal starts at a timing when all the image information of the frames 1_1 to 1_4 is provided.

In the present embodiment, the four count values are used to generate a short-second image signal. Specifically, the count values Cn(T0 to T1), Cn(T1 to T2), Cn(T2 to T3), and Cn(T3 to T4) in the four accumulation periods of time T0 to time T1, time T1 to time T2, time T2 to time T3, and time T3 to time T4 are used. Meanwhile, n indicates the full frame number, and the relation of n=1 is established in the present embodiment.

These four count values can be calculated using Cn_1, Cn_2, and Cn_3 held in the frame memory 603 and Cn_4 output from the light emission crosstalk correction unit 607.

The calculation expressions are shown in the following Expressions 1 to 4, and in the present embodiment, calculations are executed using a subtractor 6081, a subtractor 6082, and a subtractor 6083 shown in FIG. 7B. In the full frame 1, C1(T0 to T1), C1(T1 to T2), C1(T2 to T3), and C1(T3 to T4) are generated using C1_1, C1_2, C1_3, and C1_4.

$$Cn(T0 \text{ to } T1)=Cn\_1 \quad \text{(Expression 1)}$$

$$Cn(T1 \text{ to } T2)=Cn\_2-Cn\_1 \quad \text{(Expression 2)}$$

$$Cn(T2 \text{ to } T3)=Cn\_3-Cn\_2 \quad \text{(Expression 3)}$$

$$Cn(T3 \text{ to } T4)=Cn\_4-Cn\_3 \quad \text{(Expression 4)}$$

Next, an additional averaging process is performed using the four calculated count values C1(T0 to T1), C1(T1 to T2), C1(T2 to T3), and C1(T3 to T4). Specifically, the four count values are added using an adder 6084 shown in FIG. 7B, and further multiplied by ¼ using a multiplier 6085.

As a result, it is possible to generate a short-second image signal equivalent to an accumulation period (8.33 ms) that is ¼ of the long-second image signal (33.3 ms). That is, even for a subject of which the count value saturates during the accumulation period of a long-second image signal, the brightness of the subject can be expressed as a gradation by using a short-second image signal (however, the upper limit is up to four times the brightness at which the long-second image signal saturates).

In addition, since the count values acquired during four consecutive accumulation periods are additionally averaged, the period during which the short-second image signal captured an image of the subject becomes the same as the image capturing period of the long-second image signal in a pseudo way, so the position of the subject present in the image signal is not shifted.

In addition, even if a subject moving at high speed is present, the amount of blur will be the same, and thus there will be no visual discomfort even if HDR synthesis to be described later is performed. Further, even if there is a subject that periodically blinks, such as an LED or a fluorescent light, the accumulation period of the short-second image signal is lengthened in a pseudo way, so that it is possible to prevent the LED or fluorescent light from being turned off completely.

In vehicle-mounted applications, it is desirable that the accumulation period of temporally continuous short-second image signals should be 11 ms or longer. That is, when an image signal having a short accumulation period is generated by additionally averaging the first to Nth image signals, it is desirable to use an image having a continuous accumulation period of 11 ms or longer among the first to Nth image signals as a target image for additional averaging. This makes it possible to prevent the LED or fluorescent light from being turned off completely.

The short-second image signal generated by the short-second image generation unit 608 is output to the HDR synthesis unit 609. That is, in the present embodiment, an image signal having a shorter accumulation period than the Nth image signal is generated using the first to Nth image signals, and a synthetic image signal is generated using the image signal having a shorter accumulation period and the Nth image signal.

The HDR synthesis unit 609 generates a final HDR image by synthesizing the long-second image signal output from the light emission crosstalk correction unit 607 and the short-second image signal generated by the short-second image generation unit 608.

Figure 8A:
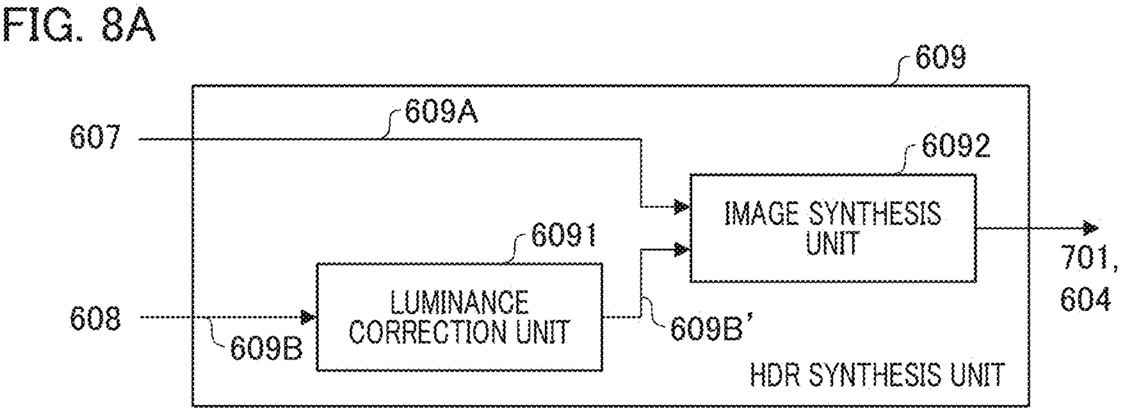
FIG. 8A is a functional block diagram illustrating a configuration example of an HDR synthesis unit 609.

Next, an HDR synthesis method in the present embodiment will be described with reference to FIG. 8A. FIG. 8A is a functional block diagram illustrating a configuration example of the HDR synthesis unit 609. The HDR synthesis unit 609 includes a luminance correction unit 6091 and an image synthesis unit 6092, and has two image signals input thereto: a long-second image signal (Cn_4) output from the light emission crosstalk correction unit 607 and a short-second image signal output from the short-second image generation unit 608.

The luminance correction unit 6091 is used to match the count value of the image signal accumulated in a short second to a level equivalent to the count value of the image signal accumulated in a long second (long period) on the basis of the ratio of the accumulation periods. By using the luminance correction unit 6091 to match the count values of the long-second image signal and the short-second image signal, the two images can be synthesized without any sense of discomfort.

Figure 8B:
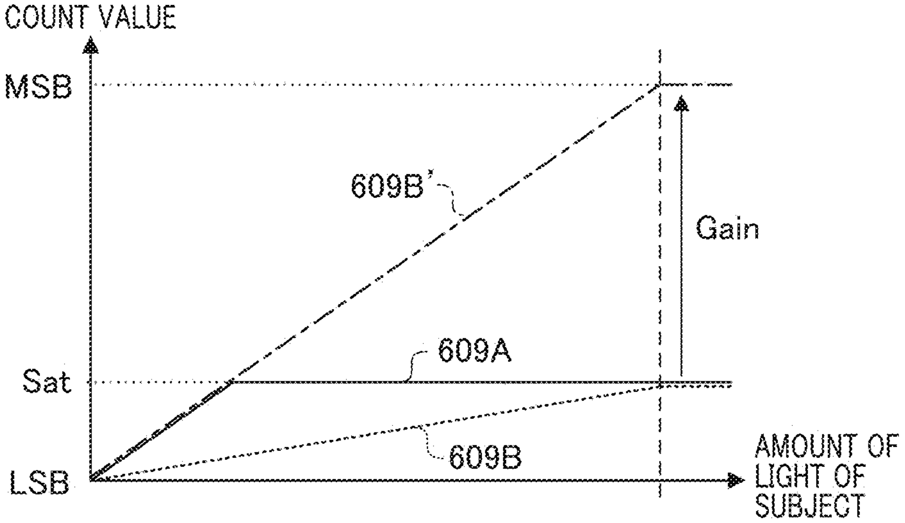
FIG. 8B is a diagram illustrating the content of processing of a luminance correction unit 6091.

FIG. 8B is a diagram illustrating the content of processing of the luminance correction unit 6091, in which the horizontal axis represents the amount of light of the subject, and the vertical axis represents the count value of the image input to the HDR synthesis unit 609. In FIG. 8B, 609A is a graph illustrating the count value of a long-second image signal with respect to the amount of light of the subject, and 609B is a graph illustrating the count value of a short-second image signal with respect to the amount of light of the subject.

In addition, 609B' denotes a graph after a luminance correction process is performed on the count value of 609B by the luminance correction unit 6091. In addition, Sat written on the vertical axis denotes the saturation count value of the photoelectric conversion element 100.

Since 609A has along accumulation period, it quickly reaches the Sat level if the amount of light of the subject increases. Since 609B has a short accumulation period, it reaches the Sat level if the amount of light of the subject is greater than that of 609A.

The luminance correction unit 6091 multiplies the count value of 609B by a predetermined Gain (amplification factor) to match the count values of 609A and 609B. Specifically, a result obtained by dividing the accumulation period during long-second accumulation by the accumulation period during short-second accumulation is calculated as Gain, and the Gain is directly multiplied by the count value of the short-second image signal.

That is, in the present embodiment, 4.0 obtained by dividing 33.3 ms by 8.33 ms is calculated as the value of Gain, and the count value of the short-second image signal is multiplied by 4.0. By doing so, the count value of the long-second image signal and the count value of the short-second image signal becomes the same count value (unless the count value is saturated).

The image synthesis unit 6092 synthesizes the count value of 609A and the count value of 609B' to generate a single dynamic range expansion image obtained by synthesizing the long-second image signal and the short-second image signal. In this way, the image synthesis unit 6092 generates a synthetic image signal by synthesizing two or more image signals having different accumulation periods among the first to Nth image signals.

Figure 8C:
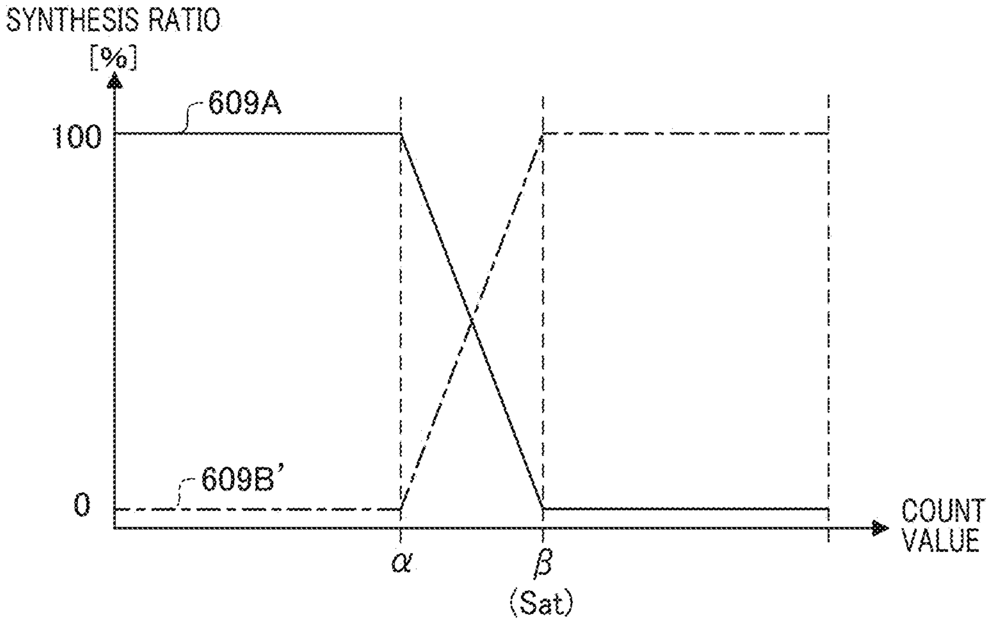
FIG. 8C is a diagram illustrating a method of generating a synthetic image using an image synthesis unit 6092.

FIG. 8C is a diagram illustrating a method of generating a synthetic image using the image synthesis unit 6092, in which the horizontal axis represents the count value of the input image and the vertical axis represents the synthesis ratio of the long-second image signal and the short-second image signal. In addition, the count values of $\alpha$ to $\beta$ on the horizontal axis are count values just in the vicinity of switching between the long-second image signal and the short-second image signal, and ideally the count value of $\beta$ is preferably set to a count value in the vicinity of Sat in FIG. 8B.

If the count value of the input image 609A is equal to or less than $\alpha$, the count value of the input image 609A of the long-second image signal is used 100%. If the count value of the input image 609A is between $\alpha$ and $\beta$, the count value of the input image 609A of the long-second image signal and the count value 609B' of the short-second image signal are each multiplied by the synthesis ratio shown in the graph of FIG. 8C, and the results are added together.

If the count value of the input image 609A is equal to or greater than $\beta$ (saturated), the count value of 609B' of the short-second image signal is used 100%. By performing such processing, it is possible to synthesize the long-second image signal acquired by long-second accumulation and the short-second image signal acquired by short-second accumulation, and to generate a single HDR image with an expanded dynamic range.

In the present embodiment, in order to describe the functions of the short-second image generation unit 608 and the HDR synthesis unit 609 separately, the short-second image generation unit 608 multiplies by ¼ and the HDR synthesis unit 609 multiplies by Gain of 4.0, but these two processes may be omitted. However, if an additional averaging process is not performed in the short-second image generation unit 608, these two processes cannot be omitted.

For example, if an HDR image is generated using any one of a plurality of acquired short-second image signals, a division process is not required in the short-second image generation unit 608, and thus a process of multiplication by Gain is required in the HDR synthesis unit 609. A final HDR image generated by the image synthesis unit 6092 is output to the camera control unit 604 and the ECU 701 in the movable apparatus 700.

Figure 10A:
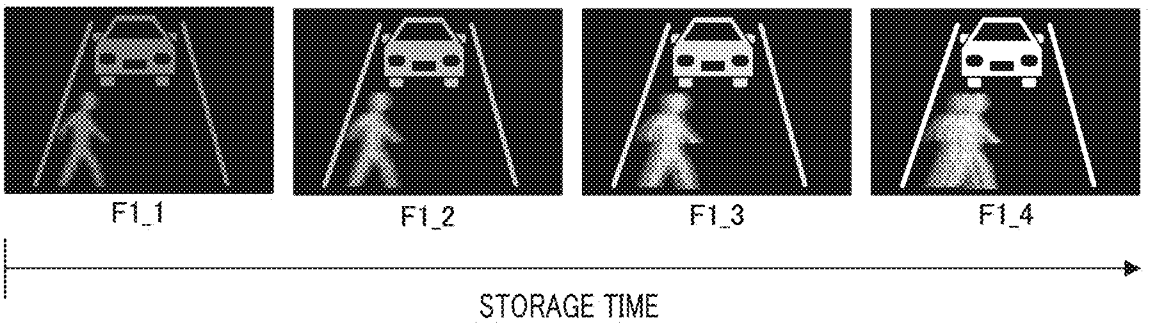
FIG. 10A is a diagram illustrating an example of images of a plurality of divided frames.

FIG. 10A is a diagram illustrating an example of images of a plurality of divided frames. As shown in FIG. 10A, the image of the frame 1_1 is dark because the accumulation period is short, and there is little movement (blur) of the subject of a person who has jumped out.

On the other hand, the accumulation period becomes longer in the order of frame 1_2, frame 1_3, and frame 1_4, and thus the movement of the subject of a person who has jumped out appears blurred. Meanwhile, the stopped vehicle and white lines are less likely to blur, and as the accumulation period becomes longer, it is more likely that the contrast will improve.

Figure 10B:
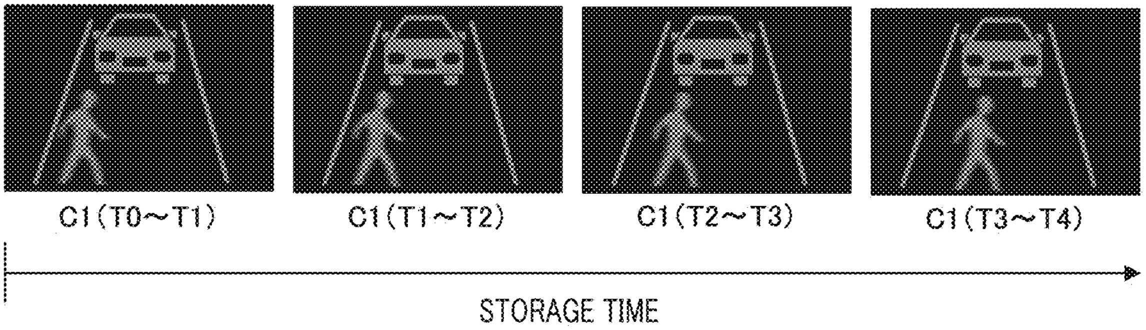
FIG. 10B is a diagram illustrating images C1(T0 to T1), C1(T1 to T2), C1(T2 to T3), and C1(T3 to T4) generated by the short-second image generation unit 608 using an image signal (count value) of FIG. 10A.

FIG. 10B is a diagram illustrating images C1(T0 to T1), C1(T1 to T2), C1(T2 to T3), and C1(T3 to T4) generated by the short-second image generation unit 608 using the image signals (count values) of FIG. 10A.

Since the accumulation period is 8.33 ms for all the images, the brightness (count value) of the subject and the amount of blur are the same. However, the position of the person who jumped out has changed. Specifically, the position of the person moves to the right in the order of C1(T0 to T1), C1(T1 to T2), C1(T2 to T3), and C1(T3 to T4).

Figure 10C:
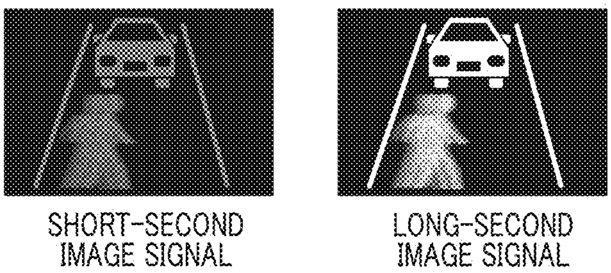
FIG. 10C is a diagram illustrating images of a short-second image signal generated by the short-second image generation unit 608 and a long-second image signal output from a light emission crosstalk correction unit 607.

FIG. 10C is a diagram illustrating, as images, the short-second image signal generated by the short-second image generation unit 608 and the long-second image signal output from the light emission crosstalk correction unit 607. Since the short-second image signal is obtained by adding all four count values in FIG. 10B once, the movement (the amount of blur) of the person who has jumped out is large and coincides with the amount of blur in the long-second image signal.

In addition, after the count values are added, they are divided by the number of frames, so that the count value after additional averaging has brightness that is ¼ that of the long-second image signal.

Figure 11:
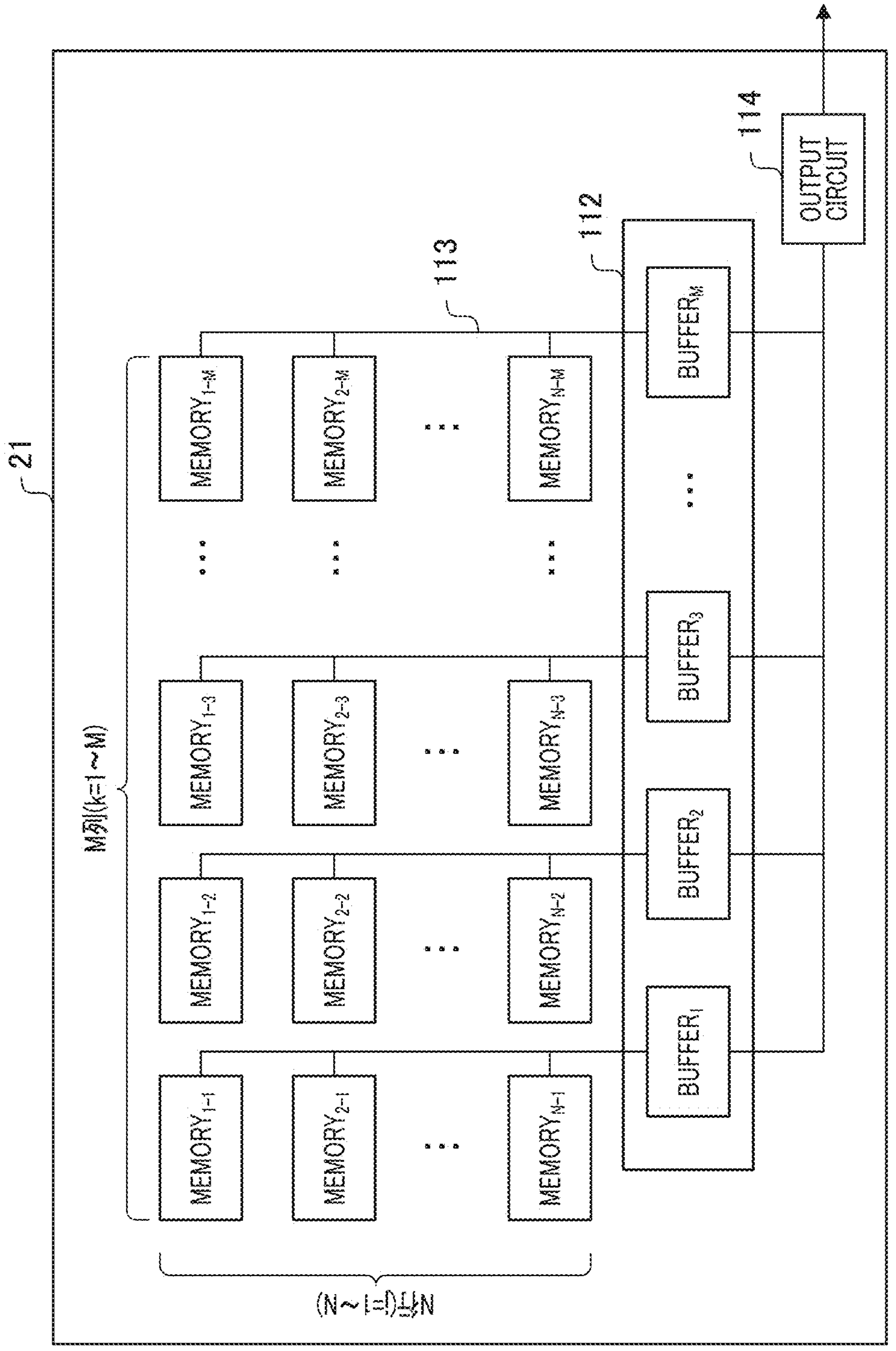
FIG. 11 is a diagram illustrating a relationship between a memory circuit and a buffer according to the embodiment.

FIG. 11 is a diagram illustrating a relationship between a memory circuit and a buffer according to the embodiment. FIG. 11 shows a state in which the memory circuits 212 in the signal processing circuit 103 in FIG. 3 are arrayed in N rows and M columns, with each memory circuit represented as a memory 1-1 to a memory N-M.

In addition, buffers 1 to M in FIG. 11 represent buffers included in the readout circuit 112 in FIG. 3. The output circuit 114 in FIG. 11 corresponds to the output circuit 114 in FIG. 3.

Figure 12:
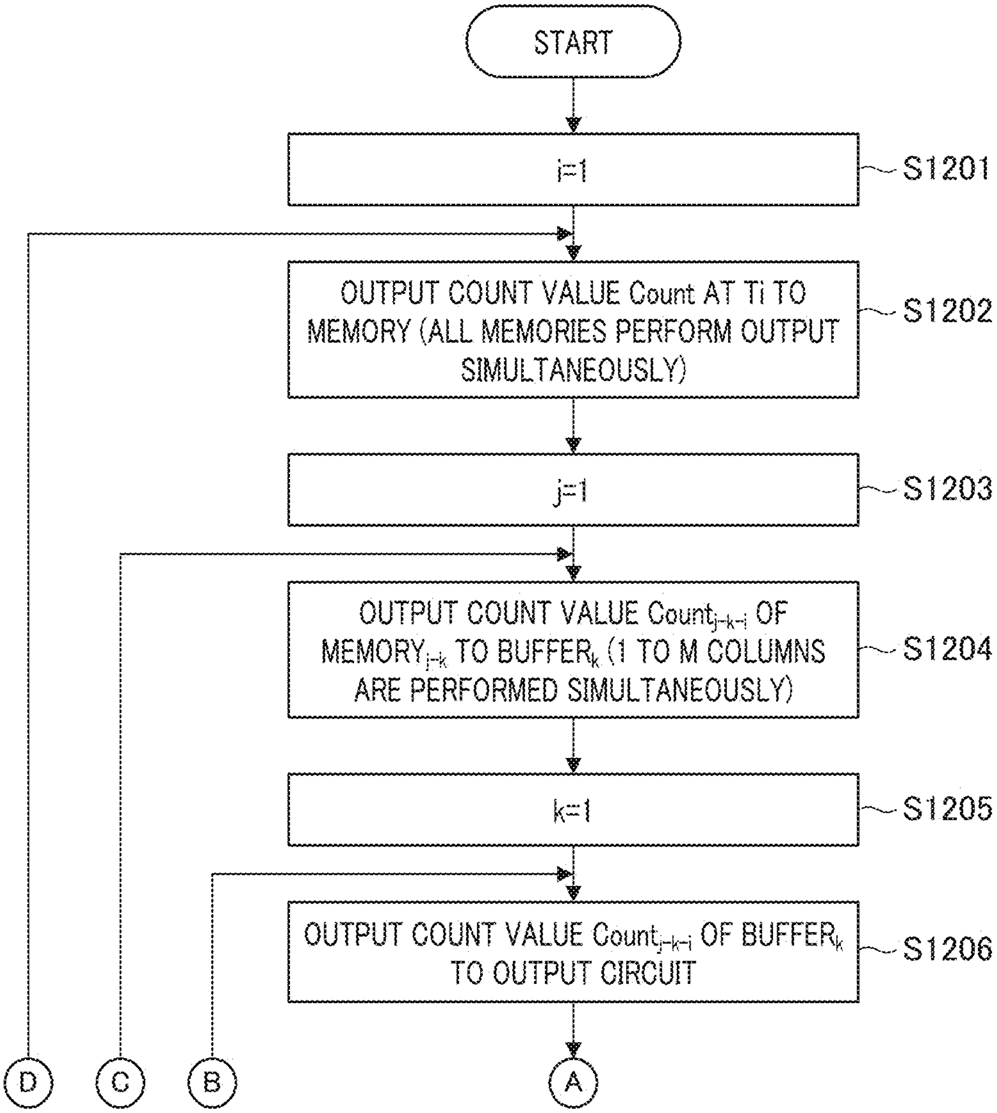
FIG. 12 is a flowchart illustrating the details of an example of driving of the photoelectric conversion element according to the embodiment.
Figure 13:
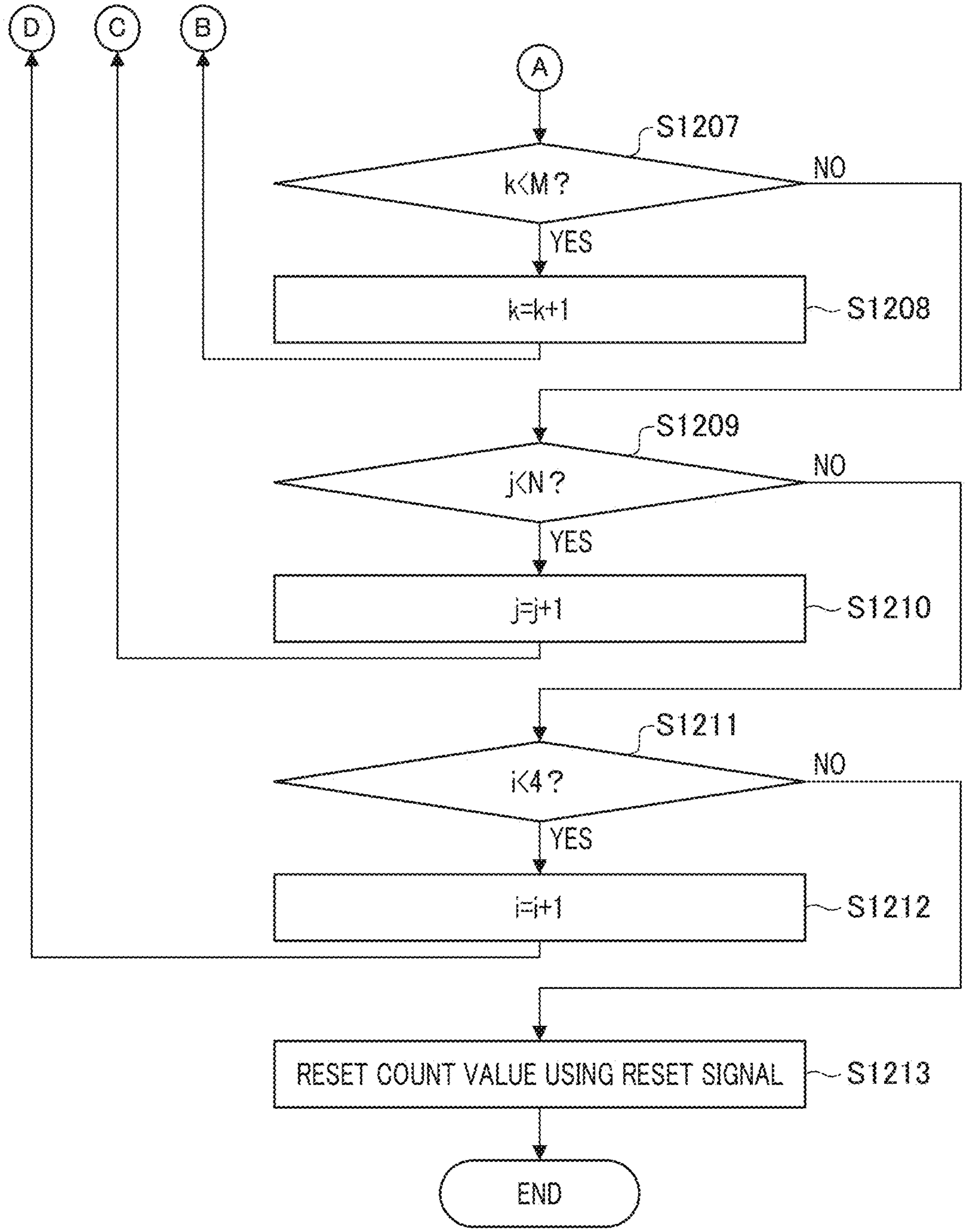
FIG. 13 is a continuation of the flowchart in FIG. 12.

FIG. 12 is a flowchart illustrating the details of an example of driving of a photoelectric conversion element in the present embodiment, and FIG. 13 is a continuation of the flowchart in FIG. 12. Meanwhile, the CPU or the like serving as a computer within the camera control unit 604 executes a computer program stored in the memory, whereby the operations of the steps in the flowcharts of FIGS. 12 and 13 are performed in sequence.

In step S1201 in FIG. 12, the relation of i=1 is set. Next, in step S1202, the count value Count of the counter circuit 211 at time Ti is output to the memory circuit 212. In this case, all the memory circuits perform the outputs simultaneously. This operation corresponds to the operation at time T1 in FIG. 9.

Next, in step S1203, the relation of j=1 is set, and in step S1204, the count value Count(j-k-i) in the memory circuit j-k in FIG. 11 is output to the buffer. In this case, 1 to M columns are output to the buffer simultaneously. This operation means that the count value of the first row in FIG. 11 is fetched into the buffer.

Next, in step S1205, the relation of k=1 is set, and in step S1206, the count value Count(j-k-i) of the buffer k is output to the output circuit 114. This operation corresponds to the operation of reading out the signals of the buffers in the leftmost column in FIG. 11 from the output circuit.

Next, the flow proceeds to step S1207 in FIG. 13 through A, it is determined in step S1207 whether k<M, if No, k is incremented by 1 as k=k+1 in step S1208, the flow returns step S1206 through B, and the operation of step S1206 is performed. This operation corresponds to the operation of reading out the signals of the buffers in the second column from the left in FIG. 11 from the output circuit.

If No in step S1207, that is, if k=M, it means that the signal of the buffer in the Mth column in FIG. 11 has been read out from the output circuit, and next, the flow proceeds to step S1209 to determine whether j<N.

If Yes in step S1209, the relation of j=J+1 is set in step S1210, j is incremented by 1, and the flow returns to step S1204 through C. This corresponds to the operation for starting to read out the next row.

If the determination in step S1209 is No, it means that reading out of all rows has been completed, and thus the flow proceeds to step S1211 to determine whether j<4. If the determination in step S1211 is Yes, the flow proceeds to step S1212, the relation of i=i+1 is set, i is incremented by 1, and the flow returns to step S1202 through D. This operation corresponds to the operation of starting the next reading out at time T2.

If the determination in step S1211 is No, it means that the reading out at time T4 is completed, and thus the flow proceeds to step S1213, where the counter circuit 211 is reset using a reset signal. This operation corresponds to the reset operation of the counter circuit 211 at time T4 in FIG. 9. In this way, the signals accumulated in the photoelectric conversion element 100 can be read out sequentially.

Meanwhile, in the above embodiment, the accumulation period of a full frame is divided into four parts, but it is not necessary to divide the accumulation period into four parts. If the effect based on HDR is desired to be enhanced, the dynamic range can be further expanded by increasing the number of divisions.

For example, if the accumulation period of a full frame for acquiring a short-second image signal is divided into ten parts, it is possible to express gradation up to the amount of light ten times the brightness at which the long-second image signal is saturated (4.0 times in the present embodiment).

Meanwhile, if the number of divisions of the accumulation period is increased using a CMOS sensor, readout noise occurs each time an image is read out, resulting in a decrease in night vision performance, whereas in the present embodiment, since a SPAD sensor is used, readout noise does not occur. Therefore, if the number of divisions is large, it is desirable to use a SPAD sensor.

In addition, if the capacity of the frame memory is desired to be reduced, the number of divisions of the accumulation period for acquiring a short-second image signal may be reduced. By doing so, the number of frames of the image signal for temporarily storing the image signal can be reduced, which makes it possible to reduce the capacity of the frame memory. In addition, if only one short-second image signal is used, the short-second image generation unit 608 is not required.

In addition, in the present embodiment, a full frame period is divided equally into four parts in order to acquire a short-second image signal. That is, the accumulation period of one full frame is equally divided into N accumulation periods and N image signals are output, but it is not necessary to divide the accumulation period equally. The accumulation period of the short-second image signal may be determined in accordance with the required expansion ratio of the dynamic range.

In addition, in the present embodiment, a short-second image signal is generated by additionally averaging four (the number of divisions of the accumulation period) image signals. That is, when an image signal having a shorter accumulation period than the Nth image signal is generated, the first to Nth image signals are additionally averaged to generate an image signal having a shorter accumulation period. However, it is not necessary to use all the images corresponding to the number of divisions of the accumulation period. Only one image signal may be used, or any other number of images may be used.

For example, one image signal accumulated during a period closest to the center of the accumulation period of the long-second image signal may be used. That is, when an image signal having a shorter accumulation period than the Nth image signal is generated, a synthetic image signal may be generated using an image signal having an accumulation period shorter than the Nth accumulation period and closest to the center of the Nth accumulation period. This makes it possible to reduce the capacity of the frame memory.

Alternatively, a synthetic image may be generated using three image signals accumulated during three periods, that is, the start, center, and end of the accumulation period, in the accumulation period of a long-second image signal. This makes it possible to realize a good balance between reducing the capacity of the frame memory and suppressing the positional deviation of the subject.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions.

In addition, as a part or the whole of the control according to the embodiments, a computer program realizing the function of the embodiments described above may be supplied to the photoelectric conversion device or the like through a network or various storage media. Then, a computer (or a CPU, an MPU, or the like) of the photoelectric conversion device or the like may be configured to read and execute the program. In such a case, the program and the storage medium storing the program configure the present invention.

In addition, the present invention includes those realized using at least one processor or circuit configured to perform functions of the embodiments explained above. For example, a plurality of processors may be used for distribution processing to perform functions of the embodiments explained above.

This application claims the benefit of priority from Japanese Patent Application No. 2023-147319, filed on Sep. 12, 2023, which is hereby incorporated by reference herein in its entirety.

What is claimed is:

1. A photoelectric conversion device comprising:

a photoelectric conversion unit emitting pulses corresponding to photons;

a counter counting the number of the pulses;

a plurality of pixels each including a memory storing a count value of the counter;

one or more memories storing instructions; and one or more processors executing the instructions to:

generate an image signal on the basis of a difference between count values of the counter at the start and end of an accumulation period, output first to (N−1)th (N≥2) image signals generated during first to (N−1)th accumulation periods during a period from the end of the first accumulation period to the end of the Nth accumulation period, wherein the first to Nth accumulation periods are within one full frame period and each of the first to (N−1)th accumulation periods is shorter than the Nth accumulation period, generate a synthetic image signal by synthesizing two or more image signals having different accumulation periods among the first to Nth image signals, and equally divide the accumulation period of one full frame into N accumulation periods and output N image signals, and wherein the one or more processors further execute the instructions to generate an image signal having a short accumulation period by additionally averaging the first to Nth image signals when an image signal having a shorter accumulation period than the Nth image signal is generated.

2. A photoelectric conversion device comprising:

a photoelectric conversion unit emitting pulses corresponding to photons;

a counter counting the number of the pulses;

a plurality of pixels each including a memory storing a count value of the counter;

one or more memories storing instructions; and one or more processors executing the instructions to:

generate an image signal on the basis of a difference between count values of the counter at the start and end of an accumulation period, output first to (N−1)th (N≥2) image signals generated during first to (N−1)th accumulation periods during a period from the end of the first accumulation period to the end of the Nth accumulation period, wherein the first to Nth accumulation periods are within one full frame period and each of the first to (N−1)th accumulation periods is shorter than the Nth accumulation period, generate a synthetic image signal by synthesizing two or more image signals having different accumulation periods among the first to Nth image signals, and equally divide the accumulation period of one full frame into N accumulation periods and output N image signals, and wherein the one or more processors further execute the instructions to use an image having a continuous accumulation period of 11 ms or longer among the first to Nth image signals as a target image for additional averaging when an image signal having a short accumulation period is generated by additionally averaging the first to Nth image signals.

3. A movable apparatus comprising:

a photoelectric conversion unit emitting pulses corresponding to photons;

a counter counting the number of the pulses;

a plurality of pixels each including a memory storing a count value of the counter;

one or more memories storing instructions; and one or more processors executing the instructions to generate an image signal on the basis of a difference between count values of the counter at the start and end of an accumulation period, output first to (N−1)th (N≥2) image signals generated during first to (N−1)th accumulation periods during a period from the end of the first accumulation period to the end of the Nth accumulation period, wherein the first to Nth accumulation periods are within one full frame period and each of the first to (N−1)th accumulation periods is shorter than the Nth accumulation period, equally divide the accumulation period of one full frame into N accumulation periods and output N image signals, generate a synthetic image signal by synthesizing two or more image signals having different accumulation periods among the first to Nth image signals wherein the one or more processors further execute the instructions to generate an image signal having a short accumulation period by additionally averaging the first to Nth image signals when an image signal having a shorter accumulation period than the Nth image signal is generated, and perform movement control for controlling movement of the movable apparatus.

4. A method of controlling a photoelectric conversion device including a photoelectric conversion unit emitting pulses corresponding photons, a counter counting the number of the pulses, and a plurality of pixels each including a memory storing a count value of the counter, wherein the method comprises:

generating an image signal on the basis of a difference between count values of the counter at the start and end of an accumulation period;

outputting first to (N−1)th (N≥2) image signals generated during first to (N−1)th accumulation periods during a period from the end of the first accumulation period to the end of the Nth accumulation period, wherein the first to Nth accumulation periods are within one full frame period and each of the first to (N−1)th accumulation periods is shorter than the Nth accumulation period;

equally dividing the accumulation period of one full frame into N accumulation periods and output N image signals, and generating a synthetic image signal by synthesizing two or more image signals having different accumulation periods among the first to Nth image signals, and generating an image signal having a short accumulation period by additionally averaging the first to Nth image signals when an image signal having a shorter accumulation period than the Nth image signal is generated.

5. A non-transitory computer-readable storage medium storing a computer program including instructions for executing the following processes:

in order to control a photoelectric conversion device including a photoelectric conversion unit emitting pulses corresponding to photons, a counter counting the number of pulses, and a plurality of pixels each including a memory storing a count value of the counter, generating an image signal on the basis of a difference between count values of the counter at the start and end of an accumulation period;

outputting first to (N−1)th (N≥2) image signals generated during first to (N−1)th accumulation periods to be output during a period from the end of the first accumulation period to the end of the Nth accumulation period, wherein the first to Nth accumulation periods are within one full frame period and each of the first to (N−1)th accumulation periods is shorter than the Nth accumulation period;

equally dividing the accumulation period of one full frame into N accumulation periods and output N image signals;

generating a synthetic image signal by synthesizing two or more image signals having different accumulation periods among the first to Nth image signals; and generating an image signal having a short accumulation period by additionally averaging the first to Nth image signals when an image signal having a shorter accumulation period than the Nth image signal is generated.

* * * * *